United States Patent [19]
Winston et al.

[11] 3,826,976
[45] July 30, 1974

[54] CALIBRATION APPARATUS AND METHOD FOR AN EDDY CURRENT PHASE SENSITIVE SELECTOR

[75] Inventors: James F. Winston, Pittsburgh; William J. Greer, Glenshaw; Malcolm S. Steele, Pittsburgh, all of Pa.

[73] Assignee: Jones & Laughlin Steel Corporation, Pittsburgh, Pa.

[22] Filed: Dec. 7, 1972

[21] Appl. No.: 313,069

Related U.S. Application Data

[63] Continuation-in-part of Ser. No. 110,459, Jan. 28, 1971, abandoned.

[52] U.S. Cl. .................................... 324/40, 324/37
[51] Int. Cl. ............................................ G01r 33/12
[58] Field of Search ............................... 324/37, 40

[56] References Cited
UNITED STATES PATENTS

| | | | |
|---|---|---|---|
| 2,942,178 | 6/1960 | Nerwin | 324/40 |
| 3,394,303 | 7/1968 | Cressman et al. | 324/40 |
| 3,408,493 | 10/1968 | Westover et al. | 324/41 |
| 3,582,772 | 6/1971 | Hammer | 324/40 |

*Primary Examiner*—Robert J. Corcoran
*Attorney, Agent, or Firm*—T. A. Zalenski; Gerald K. White

[57] ABSTRACT

Electromagnetic inspection apparatus, such as a phase sensitive eddy current inspection device, is calibrated by providing voltage pulses of selected amplitude to a calibration coil or solenoid located in fixed proximity to the inspection apparatus test coil or solenoid, creating defect-simulating magnetic disturbances which are sensed by the test coil.

2 Claims, 1 Drawing Figure

PATENTED JUL 30 1974　　　　　　　　　　　　3,826,976
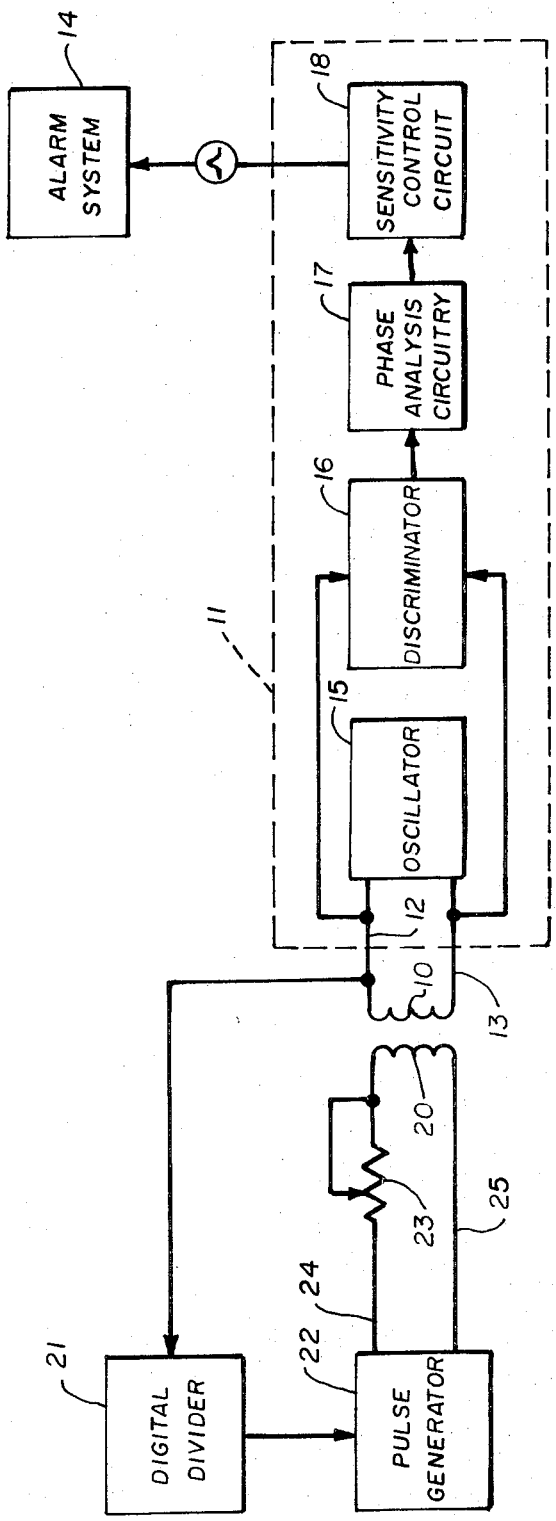
INVENTORS
JAMES F. WINSTON
WILLIAM J. GREER
MALCOLM S. STEELE
BY 　*JA Zalenski*
ATTORNEY

CALIBRATION APPARATUS AND METHOD FOR AN EDDY CURRENT PHASE SENSITIVE SELECTOR

This application is a continuation-in-part of our co-pending application Ser. No. 110,459, filed on January 28, 1971, and now abandoned.

This invention relates to calibration apparatus for inspection system generally of the type employing the principles of electromagnetism and particularly for eddy current inspection devices.

Most electromagnetic inspection systems must be calibrated so that the magnitude of a defect present in a material under inspection or a property of the material can be correlated with the representation of the respective defect or property in the form of an output signal developed by the inspection system. Thus, with an eddy current defect inspection device as applied to the inspection of the outer diameter surface of steel pipe or tubing, it is desirable to calibrate the device to a particular sensitivity level so that serious defects are detected while minor defects are not.

It is possible, of course, to calibrate electromagnetic inspection systems using materials of known properties and having defects of known characteristics. However, this calibration technique is difficult to apply in a continuous production facility where frequent calibrations are required.

The calibration apparatus of the present invention functions to provide to the test coil or solenoid of an electromagnetic inspection system magnetic disturbances of selected magnitude or amplitude, corresponding to disturbances which would be generated by defects of known characteristics passing by the test coil. This is accomplished by delivering voltage pulses, the magnitude of which can be adjusted by means of an attenuator, to a calibration coil or solenoid located in fixed proximity to the test coil. The calibration apparatus when used in conjunction with a conventional eddy current inspection device derives the voltage pulses which are delivered to the calibration coil from a periodic voltage generated by the inspection device. The frequency of the periodic voltage is reduced in a digital divider, and the resulting signal delivered to a pluse generator which in response thereto produces these voltage pulses.

An object of the present invention is to provide calibration apparatus for electromagnetic inspection systems such as phase sensitive eddy current inspection devices.

Another object of the invention is to provide calibration apparatus for an eddy current inspection device which apparatus functions to generate in the inspection device pulses of controlled amplitude, frequency and phase, the pulses being used to obtain selected device sensitivity and equalize the sensitivities among other like devices.

A further object of the invention is to provide a method for calibrating electromagnetic inspection systems such as eddy current inspection devices.

These and other objects and advantages of the present invention will become apparent from the following detailed description of an embodiment thereof with reference to the drawing which is a diagrammatic view of the calibration apparatus of the invention in conjunction with an eddy current inspection device.

A conventional eddy current inspection device includes a test coil or probe 10 connected to instrumentation 11. Typically, the instrumentation includes an oscillator 15 for generating high frequency (e.g., 16 KHz) periodic voltage which is delivered to the probe 10 through leads 12 and 13. As a result, a magnetic field is established about the probe, and when a conductive material, such as steel pipe or tubing, under inspection passes through the magnetic field, eddy currents are induced in the pipe. As long as the material under inspection is uniform, the induced eddy currents remain relatively unchanged, but when a defect, such as a crack or hole, in the material passes through the magnetic field, the magnetic field is disturbed causing the eddy currents to change.

The signal provided by the oscillator 15 and delivered to probe 10 also functions as a carrier wave which is fed to a discriminator 16 included in instrumentation 11. Changes in the eddy currents caused by a defect passing through the magnetic field generate a signal in probe 10 which signal is superimposed on the carrier wave. The discriminator functions to discriminate the defect information and send it on to phase analysis circuitry 17 included in instrumentation 11.

The phase analysis circuitry functions to apply at particular times, corresponding to the passing of the carrier wave through a particular phase position, a maximum gain to the signal it receives from the discriminator and a minimum gain to the signal otherwise. Thus, a particular type of defect, for example, a crack or pin hole in the wall of steel pipe, will result in defect signals being superimposed on the carrier wave at a particular phase position of the carrier wave. Experience with the inspection system indicates what this phase position is, and the phase analysis circuitry is manually adjusted to apply maximum and minimum gains to the discriminated signal at the appropriate times.

The output of the phase analysis circuitry is a voltage pulse, the magnitude of which is directly related to the size of the defect is represents. This pulse is delivered to a sensitivity control circuit 18 included in instrumentation 11 by means of which the amplitude of the pulse can be adjusted. An eddy current device of the type described is available from Tektran Corp. of Allentown, Pa. From the instrumentation 11, the voltage pulses are fed to a suitable alarm system 14 which is triggered when the pulse amplitude exceeds a preselected value.

The eddy-current instruments which the calibration apparatus checks selectively sense three independent paratmeter of any defect signals: amplitude, frequency, and phase relative to the oscillator wave form. The ability to selectively discriminate in favor of defect signals having certain values of amplitude, frequency, and phase greatly enhances the ability of these instruments to separate valid defect signals from noise or other false defect indications in comparison to other instruments employing only amplitude and/or frequency discrimination. This type of eddy-current device is known in the art as a phase sensitive eddy-current device.

The following will serve to illustrate an operational embodiment of the eddy current device: Assume that the device is applied to inspecting steel pipe, and it is desired to reject all pipe containing cracks or holes which are deeper than 5 percent of the pipe-wall thickness, i.e., no alarm signal is to be issued from system 14 except when a defect of a depth greater than 5 percent of the wall thickness is sensed, Further assume that the alarm system is constructed so that a minimum voltage pulse of one volt amplitude is required to trigger it. Accordingly, it will be understood that for the system to function as desired, it is necessary that when, for example, pipe having a wall thickness of 0.300 inch is under inspection, a voltage pulse of 1 volt amplitude be developed at the output of the instrumentation 11 whenever a crack or hole 0.015 inch passes the test probe 10; and when, for example, pipe having a wall thickness of 0.500 inch is under inspection a voltage pulse of one volt amplitude be developed whenever a crack or hole 0.025 inch deep passes the test probe. To accomplish the foregoing, the eddy current device must be calibrated.

The calibration apparatus of the present invention comprises calibration coil 20, digital divider 21, pulse generator 22 and attenuator 23. Coil 20 is located adjacent test probe 10 so that magnetic disturbances caused by voltage pulses applied to coil 20 are sensed by means of electromagnetic coupling through probe 10. Conventional pulse generator 22 is connected to coil 20 via leads 24 and 25 and generate voltage pulses of constant frequency and phase which are delivered to coil 20. The pulse generator in turn is driven by a pluse signal developed by conventional digital divider 21.

Digital divider 21 is connected to lead 12 by means of which the periodic voltage of oscillator 15 is fed to the divider. The divider physically divides the high frequency signal to a low pulse signal of, for example, eight pulses per second and feeds the low pulse signal to pulse generator 22 to drive the latter.

Attenuator 23 is connected to pulse generator 22 and coil 20 and is adjusted to selectively vary the amplitude or magnitude of the pulses delivered to coil 20 and the amplitude or magnitude of the magnetic disturbance created at the coil and, in this way, simulate defects, such as cracks and pin holes, of various depths. Thus, typically, the attenuator setting initially are calibrated against defects having known characteristics to relate the settings to particular defect depths. Thereafter, to calibrate the eddy current device it is only necessary to, first, adjust the attenuator to the setting which it is known produces a magnetic disturbance equivalent to that created by the minimum defect depth for which material is to be rejected and, second, adjust the sensitivity control of the eddy current device so that its output pulse generated by the magnetic disturbance is of a magnitude of one volt. Consequently, during the inspection operation, whenever defects of that depth or greater pass probe 10, a voltage pulse of a magnitude of one volt or greater (depending on the depth of the defect) will issue from the eddy current device and trigger the alarm system.

More generally, the present invention provides a method for calibrating an eddy current inspection device having a test coil, which method comprises electromagnetically coupling the test coil to a calibration coil, supplying voltage pulses to the calibration coil to develop a magnetic disturbance in the test coil and a resulting electrical output signal from the inspection device indicative of the magnitude of the magnetic disturbance, adjusting the magnitude of the voltage pulses to a preselected level to vary the magnitude of the magnetic disturbance and the resulting electrical output signal, and thereafter, adjusting the magnitude of the output signal to a preselected level.

The calibration apparatus of the present invention is also used to adjust a plurality of eddy current devices to equal sensitivity levels. A single calibration system is used with all the probes of the eddy current devices being positioned equidistant from the calibration system coil and all the eddy current devices being connected through appropriate switching circuitry to the digital divider of the calibration apparatus. The switching circuitry is applied so that the eddy current systems are individually calibrated.

A particular eddy current device may generate a periodic voltage the frequency of which may vary from a nominal frequency. Also, similar eddy current devices may generate periodic voltage of different respective frequencies. In order to accurately maintain calibration of a single device over a period of time and to equalize the sensitivities of a number of devices operating at different respective frequencies, a fixed phase relationship must be maintained between the voltage pulse applied to the calibration coil 20 and the periodic voltage supplied to the text coil 10. In the calibration apparatus of the invention, the fixed phase relationship is maintained as a result of the periodic voltages of the eddy current devices being applied to a single divider network 21.

We claim:

1. In combination with a phase sensitive electro magnetic inspection apparatus, including a test coil, a high frequency oscillator connected to said test coil, a discriminator responsive to said test coil, phase analysis circuitry and a sensitivity control means, a calibration apparatus, comprising:

a calibration coil electro magnetically coupled to said test coil; pulse generating means electrically connected to said calibration coil for generating calibration pulses of controlled frequency and phase; digital divider means electrically connected to said test coil and responsive to said high frequency oscillator for synchronizing the phase of said calibration pulses; and means electrically connected to said calibration coil and said pulse generating means for selectively varying the amplitude of said calibration pulses.

2. A method for calibrating a phase sensitive eddy current inspection device having a test coil and high frequency oscillator, including the steps of:

electro magnetically coupling said test coil to a calibration coil;

supplying calibration pulses of controlled frequency and phase to said calibration coil to develope a magnetic disturbance in said test coil and a resulting output signal from the inspection device indicitive of the amplitude and phase of the magnetic disturbance; phase synchronizing said calibration pulses to the output of said high frequency oscillator;

adjusting the amplitude of the calibration pulses to a preselected level to vary the amplitude of the magnetic disturbance and the resulting electrical output signal; and thereafter adjusting the amplitude of the output signal to a preselected level.

* * * * *